United States Patent [19]

Melendy et al.

[11] Patent Number: 5,553,758
[45] Date of Patent: Sep. 10, 1996

[54] NOZZLE ADAPTOR FOR APPLYING HOT MELT ADHESIVE

[76] Inventors: Peter S. Melendy; Richard A. Belanger, both of 3 Merrill Industrial Dr., Hampton, N.H. 03842

[21] Appl. No.: 378,820

[22] Filed: Jan. 27, 1995

[51] Int. Cl.$^6$ ...................................................... B67D 5/06
[52] U.S. Cl. ........................... 222/533; 222/536; 222/568
[58] Field of Search ................... 222/146.5, 330, 222/153.09, 482, 485, 533, 536, 565, 568, 575; 279/390, 391, 397, 587.1, 587.5, 566, 595, 600, 602

[56] References Cited

U.S. PATENT DOCUMENTS

| 931,757 | 8/1909 | Harmer | 239/391 |
| 2,195,811 | 4/1940 | Bramsen et al. | 239/587.5 |
| 3,604,597 | 9/1971 | Pohl et al. | 222/146.5 |
| 3,779,467 | 12/1973 | Arbon | 239/587.5 |
| 4,523,705 | 6/1985 | Belanger et al. | 222/146.5 |
| 4,613,396 | 9/1986 | Scarborough | 222/330 |

*Primary Examiner*—Andres Kashnikow
*Assistant Examiner*—Philippe Derakshani
*Attorney, Agent, or Firm*—Dickinson, Wright, Moon, Van Dusen & Freeman

[57] ABSTRACT

A glue gun includes a nozzle body and a replaceable nozzle cap. The body is mounted in a melt casting of the glue gun such that it is rotationally adjustable. Thus, a rotationally asymmetric nozzle cap is more easily used because the nozzle body can be rotated to correct misalignment of the cap due to differences in the orientation of threads holding the cap to the body.

A preferred nozzle includes a plurality of openings that allows the application of several small beads. These beads can be pressed into a thin layer if delay tack adhesive is used. Also, a slotted nozzle can be used to apply the thin film

9 Claims, 1 Drawing Sheet

NOZZLE ADAPTOR FOR APPLYING HOT MELT ADHESIVE

TECHNICAL FIELD

This invention relates to methods and apparatus for the application of hot melt adhesives. In particular, the invention includes a nozzle for a hot melt glue gun for application of a thin film of a delay tack adhesive and a method for the application of the delay tack adhesive.

BACKGROUND

Apparatus for the application of hot melt adhesives are well known. An example of one such device, a "glue gun," is shown in U.S. Pat. 4,523,705 (Belanger et al.). Such a glue gun typically includes a dispensing nozzle with a narrow dispensing channel and a spring loaded check valve to stop passage of the melted adhesive through the channel when pressure on a glue stick is released. The outlet of the dispensing channel is typically round such that the glue gun applies a bead of adhesive in use. These glue guns do not generally lend themselves to different types of applications, in part, because the shape of the outlet nozzle is not easily altered.

It is known to provide replacement nozzles for glue guns, particularly in glue guns used for industrial purposes. These replacement nozzles take various shapes and include radially symmetrical nozzles, for which the radial orientation on the gun is not important, as well as radially asymmetric nozzles, for which the radial orientation on the gun is important. These guns typically rely on a screw threaded attachment between the gun and the nozzle, and techniques have been developed for ensuring the proper orientation of the replaceable nozzle. One such technique is to match the threads on the gun to the threads on the nozzle so that the nozzle naturally assumes the correct orientation. A problem with this technique is that the manufacture of parts with matched threads is very expensive. Another technique is to use a selected number of spacers to adjust the position of the nozzle. This technique is very time consuming and requires a supply of the spacers to be on hand.

SUMMARY OF THE INVENTION

In accordance with the invention, a nozzle for a hot melt glue gun includes a body portion and a replaceable dispensing cap. The body and cap are threaded to allow the body removably to receive a variety of caps of different shapes for a variety of applications. The body is received in a holder, such as a hand held hot melt glue gun. The body is, however, rotationally adjustable with respect to the holder. Thus, the combination of the body and the cap can be rotated with respect to the glue gun to orient the cap to a desired orientation for that particular cap.

The capability of rotational orientation is provided in the preferred embodiment by the interaction between an annular groove in the body of the nozzle and a lock pin that fits in the groove. The pin fixes the longitudinal location of the nozzle body in the glue gun while allowing rotation of the body. In addition, an O-ring seal is provided to ensure that the liquid adhesive does not leak through the joints between the nozzle body and the holder.

The outer end of the nozzle body preferably has an extended cylindrical "lead" to receive the cap during installation and guide it onto the threads.

The caps in accordance with the invention can take any of several shapes. Advantageous shapes are a slot and a plurality of closely spaced dispensing orifices. These shapes have been found to be particularly useful to apply a thin film of adhesive for a variety of uses. One such use is to apply the thin film to a sheet of transfer paper. The film can then be transferred to another substrate by pressing the film onto the substrate and removing the transfer paper.

The application of a thin film to a substrate with the nozzles of the invention preferably includes the use of an adhesive known as a "delay tack" adhesive. These adhesives are generally known in the art and are made of compositions with the characteristic that crystallization is delayed for a period, such as five minutes, while retaining "tack." This allows the user to bond items as long as two to three minutes after application of the glue. Further, the glue "line gap" that is created when the two items are pressed together is smaller because the glue has not crystallized and can be spread to a thin layer by simply pressing the items together.

BRIEF DESCRIPTION OF THE DRAWINGS

FIG. 2b is a front view of the cap shown in FIG. 2a.

FIG. 4b is an end view of the cap extension of FIG. 4a.

DETAILED DESCRIPTION OF THE PREFERRED EMBODIMENTS

Figure 1:
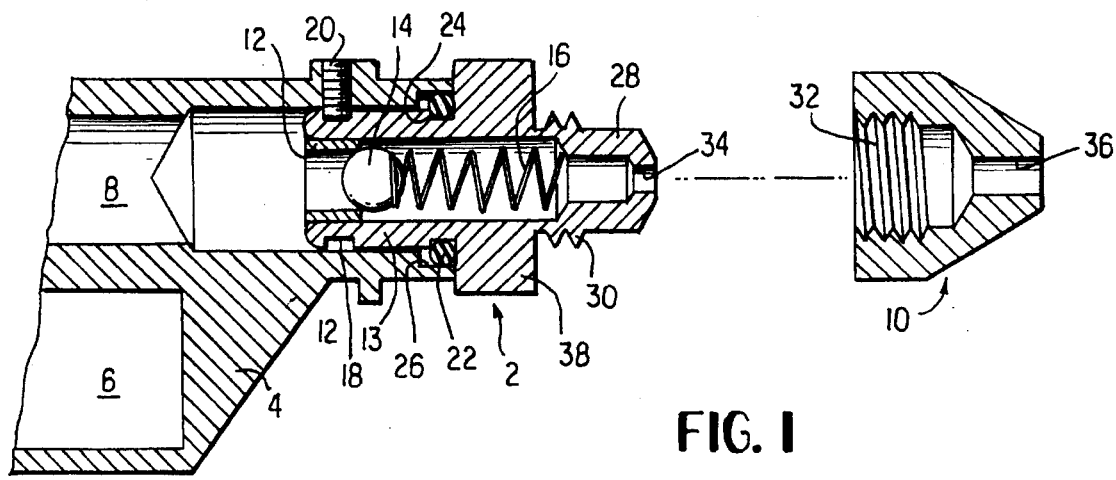
FIG. 1 is a partly exploded vertical cross section of a part of a glue gun and a nozzle in accordance with the invention.

With reference to FIG. 1, a nozzle body 2 in accordance with the invention is shown secured to a heat casting 4 of a hot melt glue gun. The casting 4 includes a cavity 6 for receiving a heating element, such as a PTC element (not shown), and a melt chamber 8 for receiving a stick of hot melt glue (not shown). The nozzle in accordance with the invention generally comprises the nozzle body 2 and a nozzle cap 10 that fits over the end of the nozzle body and controls the shape of the dispensed glue.

The nozzle body 2 includes a bushing 12, a ball 1.4, and a spring 16, which form a check valve to control the flow of melted glue through the nozzle in known manner. Namely, the spring urges the ball against the bushing to stop flow of glue When the pressure in the chamber 8 is smaller than a predetermined amount. When the pressure in the chamber 8 increases, as by application of pressure to a glue stick, the ball is lifted from the bushing to allow glue to flow therethrough.

The nozzle body is secured to the casting by structure that permits the nozzle body 2 to be rotationally adjusted with respect to the casting and, hence, the remainder of the glue gun. The preferred engagement, shown in FIG. 1, comprises an annular groove 18 that is formed in one end 13 of the nozzle body and a locking pin 20 that is held in the casting 4. During assembly, the nozzle body is inserted in the casting, until the casting contacts the lug 38 and the pin is pushed into the groove such that the nozzle body is held longitudinally in the casting but is allowed to rotate with respect to the casting. The engagement is adjusted to require the desired rotational force to effect rotation.

To prevent leakage of the melted glue, an O-ring 22 is held in a groove 24 in the nozzle body. The O-ring engages a surface 26 upon assembly to form the desired seal.

The end of the nozzle body 2 includes a portion for receiving the nozzle cap 10. This portion of the nozzle body includes an elongate tip 28 and threads 30. The elongate tip 28 assists in the alignment of the cap 10 during assembly, and the threads cooperate with threads 32 on the cap 10. The threads 28 and 32 are preferably coarse so that the cap requires no more than two turns to snugly attach the cap to the body. When so attached, the melted glue passes through opening 34 in the body to the tip and then through opening 36 in the tip to the substrate (not shown).

If the opening 36 is not rotationally symmetric, the ultimate radial orientation of the cap will affect the application of the adhesive. Thus, according to a feature of the invention, the nozzle body may be rotated by turning it with respect to the casting to properly orient the opening 36. Rotation may be effected by engaging a lug 38 with a wrench (not shown).

Figure 2A:
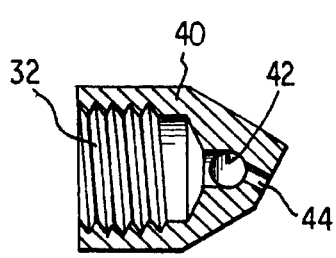
FIG. 2a is a vertical cross section of a nozzle cap in accordance with the invention.
Figure 2B:
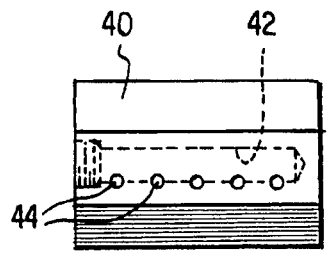

FIGS. 2a and 2b show a nozzle cap 40, which is particularly useful for application of a thin ribbon of adhesive, for example, a delay tack adhesive. The cap 40 includes threads 32 similar to those of cap 10 for engaging the threads 30 on the nozzle body. The opening for dispensing the glue, however, is different. In the cap shown in FIGS. 2a and 2b, the glue is directed to a cross channel 42, which supplies a plurality of dispensing openings 44. The openings 44 allow the adhesive to be laid down in a series of parallel beads as the nozzle is moved over the substrate. When the adhesive is a delay tack adhesive, another material, such as a transfer sheet; may be pressed onto the adhesive to flatten it into a thin film. The thin film may then be transferred to another surface by use of the transfer sheet.

Figure 3:
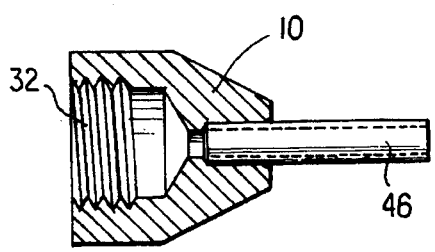
FIG. 3 is a vertical cross section of another nozzle cap in accordance with the invention.

FIG. 3 shows a modification of the cap shown in FIG. 1. An extension 46 is fitted in opening 36 to allow the adhesive to be applied in a confined space, such as a groove.

Figure 4A:
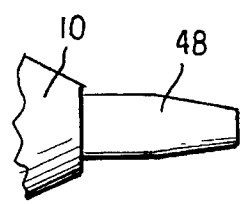
FIG. 4a is a side view of a cap extension in accordance with the invention.
Figure 4B:
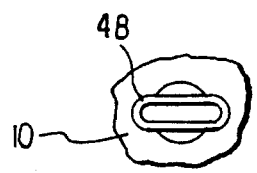

FIG. 4 shows a further modification wherein the extension is in the shape of a slot. This allows the adhesive to be laid down as a thin film, the thickness of the film being dependent on the width of the slot and the degree to which the material is thinned by pressing the two items together. Preferably, the adhesive is formed into a film having a maximum dimension of about 0.050 inch.

Modifications within the scope of the appended claims will be apparent to those of skill in the art.

We claim:

1. A nozzle for dispensing liquid material comprising a nozzle body for passing said liquid material therethrough, means for engaging a holder for said nozzle body, and for securing said nozzle body to said holder longitudinally while permitting rotation of said body with respect to said holder, seal means for providing a liquid seal between said nozzle body and said holder, and means for removably attaching a nozzle cap to said nozzle body, said means for removably attaching providing a rotationally fixed attachment between said nozzle cap and said nozzle body, whereby said means for securing permits adjustment of the orientation of a said cap with respect to said holder.

2. A nozzle according to claim 1 wherein said means for securing comprises an annular groove in said body for receiving a locating pin.

3. A nozzle according to claim 2 wherein said seal means comprises an O-ring for engaging said holder.

4. A nozzle according to claim 1, wherein said means for removably receiving comprises a threaded extension of said body.

5. A nozzle according to claim 1 in combination with said holder, wherein said material is hot melt adhesive.

6. A combination according to claim 1 wherein said holder is a hand held glue gun.

7. A nozzle according to claim 1 wherein said nozzle cap comprises a head portion with a plurality of spaced dispensing orifices for dispensing a ribbon of said material.

8. A nozzle according to claim 6 wherein said means for engaging comprises a first end for being received in an opening in said holder and a second part for contacting the end of said holder.

9. A nozzle according to claim 8 wherein said second end comprises a lug for facilitating rotation of said body.

* * * * *